May 4, 1965 K. R. LUNG ETAL 3,181,802
WASTE GRINDER
Filed Dec. 28, 1961 3 Sheets-Sheet 3

INVENTORS
KENNETH R. LUNG,
BY ANTHONY J. LOTSPIH &
EDMUND H. SCHIEVE
Marshal, Biebel, French & Bugg
ATTORNEYS

United States Patent Office 3,181,802
Patented May 4, 1965

3,181,802
WASTE GRINDER
Kenneth R. Lung, Morehead City, N.C., and Anthony J. Lotspih and Edmund H. Schieve, both of Dayton, Ohio, assignors to The Tait Manufacturing Company, Dayton, Ohio, a corporation of Ohio
Filed Dec. 28, 1961, Ser. No. 162,780
15 Claims. (Cl. 241—257)

This invention relates to a waste grinder or garbage disposer unit and particularly to a unit of this type adapted for use in a domestic kitchen.

Safety factors which protect the user from injury and features which maintain the noise and vibration levels below a maximum permissible level are important considerations in the design af waste grinders for use in the home. Hence the inlet to the grinder should have a splash guard which allows garbage or other waste material to be easily inserted therethrough but which prevents this waste material from leaving the grinder, even when propelled upwardly from the grinding chamber at a high rate of speed. For maximum reduction of the noise and vibrations generated during the grinding operation, the assembly should be of sturdy but simple construction, isolated from metal to metal contact with the associated sink and drain so that these noises and vibrations are not amplified.

It is also of prime importance that waste grinders which are to be used in the home be dependable in operation and capable of reducing bones and other hard and tough materials without this material becoming wedged between operative components of the grinder and thereby stopping its operation. Reduction of the time required and the noise and vibration generated during the grinding of these hard tough materials is especially important and must be kept to a minimum in order for the unit to be acceptable.

Accordingly, it is an important object of the invention to provide a waste grinder for domestic use which will quickly and substantially noiselessly comminute waste material including hard tough materials such as bones to a size that can be readily handled by a conventional drainage system.

Another object of the invention is to provide a waste grinder having a novel mounting apparatus which is simple in design and substantially reduces the vibration and noise transferred from the grinder to the associated sink.

A further object of this invention is to provide a novel splash guard which resists deformation resulting from continued use over long periods of time and which covers the inlet opening to the waste grinder for easy insertion of waste material therethrough but which resists passage of the waste particles propelled outwardly of the waste grinder and which, additionally, is capable of supporting a layer of water above the opening to the grinder to form a sound barrier.

Another object of the invention is to provide an improved waste grinder or garbage disposer unit of simple but rugged design for maximum dependability and operational life, and particularly a unit which is relatively inexpensive.

An additional object of this invention is to provide an improved waste grinder assembly having a solid housing for reducing vibration and noise and incorporating grinding, cutting and shredding devices which cooperate to reduce waste material including hard tough objects to minute particles quickly and without the possibility that the grinder assembly will become jammed by this material.

Still further objects and advantages of the invention will be apparent from the following description, the appended calims and the accompanying drawing.

Figures 1, 2, 3:
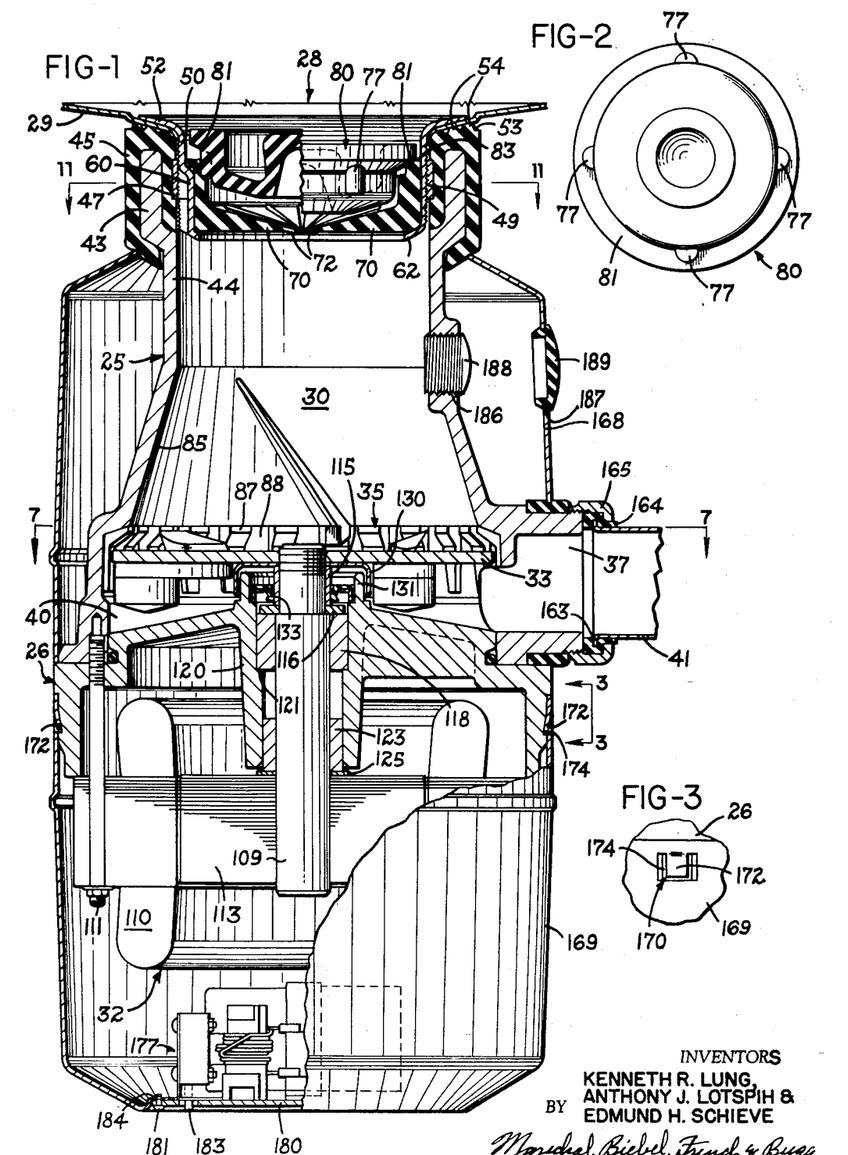
FIG. 1 is a side view partially in cross-section and partially in elevation illustrating the entire waste grinder assembly mounted on a sink.
FIG. 2 is a plan view of the bottom of the rubber stopper.
FIG. 3 is a fragmentary view looking along the view line 3—3 of FIG. 1.

Referring to the drawings, which illustrate a preferred embodiment of the invention, FIG. 1 shows a cross-section of a waste grinder unit of a type adapted for use in the kitchen of a home. The unit includes upper and lower housings or castings 25 and 26 which are interconnected and supported from the drain opening 28 in the bottom of the sink 29. Castings 25 and 26 are preferably made of cast iron or like heavy material, so that the noise and vibration generated therein during the grinding operation will be held to a minimum.

The upper casting 25 generally defines the side walls of a comminution or grinding chamber 30, and the lower casting has a motor 32 mounted thereon for driving the rotor 33 which forms the bottom of the grinding chamber 30 and cooperates with the shredder ring 35 to reduce the waste material to small particles suitable for handling by a household drain system. The upper casting 25 is provided with a discharge port 37 which communicates with the discharge chamber 40 formed below the rotor 33 and which connects to a suitable drain 41, such as is normally provided for the sink 29.

The grinder unit is resiliently secured below the sink 29 in communication with the opening 28 by a mounting assembly, shown in FIG. 1, which eliminates metal to metal contact between the unit and the sink 29 thereby substantially reducing the vibration transferred to the sink with a consequent reduction in the noise level. This assembly includes an annular flange 43 formed on the upper end of casting 25 and having inner and outer diameters which are greater than the adjacent cylindrical section 44 of the casting 25.

A rubber mounting ring 45 entirely surrounds this flange 43 and is bonded thereto by an epoxy resin or the like. The ring 45 has an internally threaded retaining ring 47 bonded thereto, preferably during molding thereof, with the threads 49 exposed in the grinder inlet for threaded engagement with externally threaded sleeve 50. The outwardly extending upper flare 52 of this sleeve 50 has an outside diameter sufficiently greater than the diameter of the aperture 28 so that when the sleeve 50 is placed through the aperture 28 into threaded engagement with the ring 47, the unit is securely supported on the sink bottom 29 without metal to metal contact therebetween. When properly mounted, the upper surface 53 of the rubber ring 45 engages the lower periphery of the sink 29, and the annular ribs 54 permit the ring to be readily adapted to the slope of the bottom of sink 29.

The rubber splash guard 55, shown in FIGS. 1 and 11–13, includes a tubular body 57 having a plurality of axially extending grooves 58 in the outer surface thereof for engagement with the similarly spaced axially extending projections 60 on the sleeve 50 for preventing relative angular movement therebetween. Downward movement of the splash guard 55 is limited by its engagement with the internal flange 62 on the lower end of the sleeve 50 so that the guard 55 cannot be forced into the grinding chamber 30. An outwardly extending lip 64 (FIG. 13) is provided around the entire upper periphery of the guard 55 and has an outside diameter slightly larger than the internal diameter of the sleeve 50, and hence fits snugly against the inside of the sleeve 50 to hold the splash guard 55 securely in position during normal operation while permitting it to be inserted and removed by hand with ease.

Projecting slightly downwardly and inwardly from the lower internal sides of the body portion 57 of the splash guard 55 are a series of triangular shaped segments 65 which are spaced from one another by the slots 67. Below each of these segments is a centrally positioned integral rib 70 which has its maximum depth or vertical dimension, as viewed in FIG. 13, at its integral connection with the body 57 and which decreases progressively therefrom to a point near the apex 72 of the segment 65.

In the preferred manner of forming this splash guard 55, the segments 65 are initially molded as an integral diaphragm element with the ribs 70 spaced around the bottom thereof. A small aperture 74 is then cut in the center of this diaphragm element, and the thin slots 67 are cut therefrom using the aperture as a starting point. However, the method utilized in constructing this component is in no way intended to limit the scope of the invention.

The novel construction of the guard 55 as just described permits large and small objects to be readily inserted from the sink 29 downward through the splash guard 55 while substantially preventing the exit of any objects or particles which are propelled upwardly from the grinding chamber 30 during the grinding operation. Thus when an object exerts a downward pressure on the top surface of the segments 65, the ribs 70 tend to be compressed in a lengthwise direction and hence readily collapse or buckle permitting the downward movement of the segments and allowing the object to pass through the guard 55. However, when upward pressure is exerted on the lower surface of the segments 65, the ribs 70 are tensioned and resist upward movement of the segments 65 to a much greater extent than their downward movement. The ribs 70 also maintain the shape of segments 65 after the guard has been used for some time, thereby eliminating curling which often occurs near the apex of the segments in similar prior art devices.

A pool of water can be formed in the splash guard 55 by maintaining the volume of water flowing into the guard 55 from the sink 29 at substantially the same rate at which it is flowing through the slots 67 to the grinding chamber 30. The ribs 70 give added support to the segments 65 and hence permit this pool to be supported thereabove for the purpose of reducing the sound passing through this area of the unit.

The inner portion of the splash guard body 57 contains several axial grooves 76 (see FIG. 11) open at their upper ends for receiving the similarly shaped and spaced projections 77 on the rubber stopper 80 (FIG. 2). When the stopper 80 is placed so that these projections 77 are received in the grooves 76, the flange 81 of the stopper 80 seats against the shoulder 83 of the body 57 and blocks flow of liquid therebetween, as shown on the right side of FIG. 1. However, when the stopper 80 is raised and rotated to misalign the projections 77 and grooves 76, the projections will be supported on the shoulder 83 and the flange 81 will be spaced therefrom, as shown on the left side of FIG. 1, so that liquid will flow therebetween into the grinding chamber 30.

While the mounting ring 45, splash guard 55 and stopper 80 have been illustrated and described as being made of rubber, it should be understood that it is within the scope of this invention to use other materials, such as synthetic rubbers and plastics, so long as the foregoing functional characteristics are substantially maintained.

The upper casting 25 includes a frusto-conical section 85 immediately below the cylindrical section 44, and the shredder ring 35 is formed thereon adjacent its lower side. This shredder ring 35 includes a series of alternate ribs 87 and channels 88, as shown in FIGS. 4–7, and its specific configuration can best be described by visualizing the ring without the channels 88. Thus as shown in FIG. 6, the ring 35 has an upper cylindrical section 90 having a diameter slightly greater than the lower diameter of the frusto-conical section 85 and with an outwardly tapered section 91 therebelow. Immediately below the tapered section 91 is another and larger cylindrical section 92 which tapers slightly outwardly and consequently has a slightly larger diameter at its lowermost end.

Figure 4:
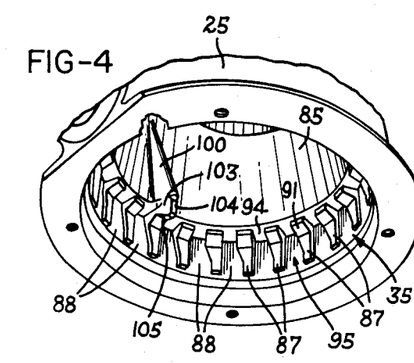
FIG. 4 is a perspective view of the grinding chamber and shredder ring as viewed from below and to one side of the upper casting.
Figures 5, 6:
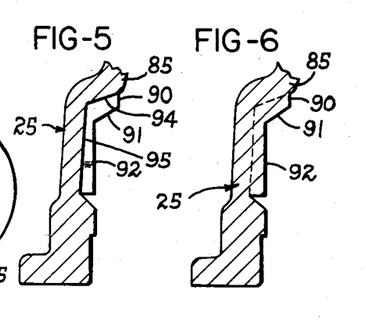
FIG. 5 is a sectional view essentially along the line 5—5 of FIG. 7.
FIG. 6 is a sectional view similar to FIG. 5 but taken along the line 6—6 of FIG. 7.

The channels 88 are equally spaced around this shredder ring and include, as shown in FIGS. 4 and 5, a top portion 94 which extends through the upper and tapered sections 90 and 91 with a gradually increasing depth and a substantially constant width. Each of these portions 94 connects with a lower portion 95 in the section 92 having a width and depth which gradually increase in a downward direction for permitting waste material to pass readily therethrough once it enters this portion of the channel 88. The preferred method of constructing the shredder ring 35 comprises forming the channels 88 when casting the upper casting 25 and then machining the faces of the sections 90, 91 and 92.

Figures 7, 8, 9, 10:
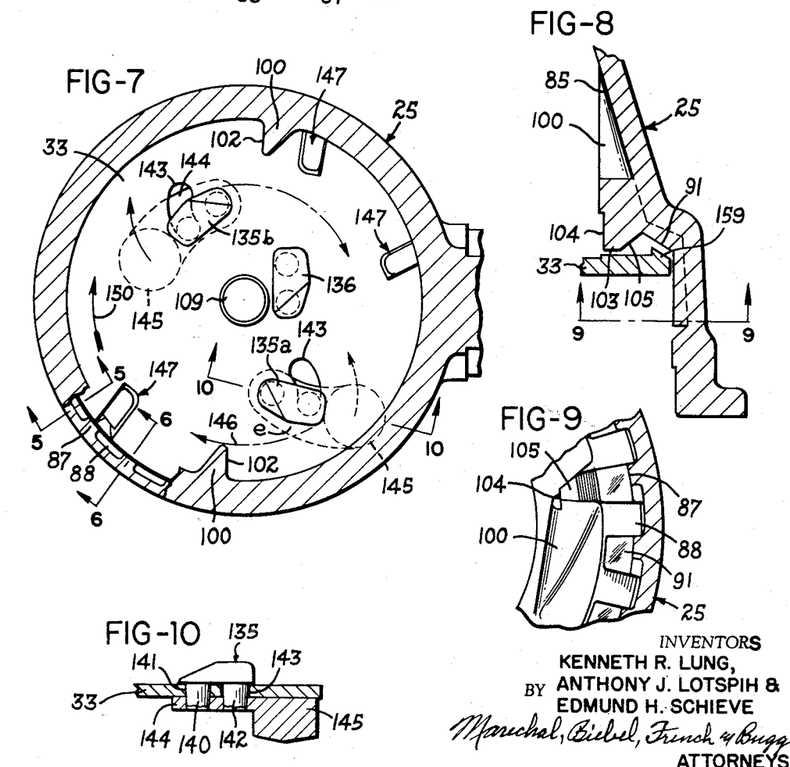
FIG. 7 is a sectional view essentially along the line 7—7 of FIG. 1.
FIG. 8 is a vertical sectional view through a portion of the rotor, through the rotor, grinding chamber and shredder ring.
FIG. 9 is a sectional view essentially along the line 9—9 with the rotor not shown.
FIG. 10 is a sectional view essentially along the line 10—10 of FIG. 7 illustrating a weight connected to a pivotal cutter.

Vanes 100 are formed integrally with the frusto-conical section 85 and extend downwardly from near the top thereof to the tapered section 91 of the shredder ring 35, as shown in FIGS. 4 and 8. They are substantially triangular in horizontal cross-section and slope downwardly in the direction of rotation of the rotor 33. The trailing side 102 of each vane is substantially perpendicular to the adjacent wall of the frusto-conical section 85 for imparting an anti-rotational force to the waste material which contacts it when the unit is in operation. The lower end 103 of each vane 100 terminates in alignment with a rib 87 (see FIG. 9) for cooperation therebetween and so that there is no obstruction to any of the channels 88. This lower end 103 is relieved at 104 and has a surface 105 which forms an oblique angle with the tapered section 91 of the shredder ring 35 for purposes to be described in detail hereinafter.

While the preferred design of the assembly contemplates two of the above described vanes 100 it is within the scope of the invention to eliminate one of these vanes or to add several others at spaced intervals around the frusto-conical section.

The rotor 33 is rotatably mounted on the lower casting 26 by a drive shaft 109 and has the general configuration of a thin metal disk having a number of cutting devices thereon. As best shown in FIG. 8, the rotor 33 has a diameter slightly less than the cylindrical section 92 of the shredder ring 35 for close cooperation therebetween, and its vertical position is just below the lower ends 103 of the vanes 100 and the tapered section of the ring 35 so that the outer periphery of the rotor cooperates with both the ring and the vanes.

The drive motor 32 includes a stator 110 connected to the lower casting 26 by the through bolts 111 which also extend through the casting 26 into threaded engagement with upper casting 25 to interconnect each of these components. As shown in FIG. 1, the rotor 113 of the motor 32 and the attached drive shaft 109 are held against downward vertical movement by the sleeve 115 which fits around the upper portion of the shaft 109 and acts as a spacer between the rotor 33 and the thrust bearing 116. This thrust bearing 116 is in turn supported by the bearing 118 which is preferably press fitted into the hub 120 and held against downward movement by the shoulder 121. The lower bearing 123 is similarly press fitted into the hub 120 and is engaged by a thrust bearing 125 for preventing upward movement of the shaft 109.

A shield is provided around the upper bearing assembly and includes a sheet metal hub element 130 which surrounds the upwardly projecting annular flange 131 on the lower casting 26, as shown in FIG. 1, for substantially prohibiting solid waste material from entering this bearing assembly. A water seal 133 is provided between the flange 131 and the sleeve 115 to prevent liquids from passing therebetween especially when the waste grinder is not in operation and liquids are allowed to accumulate therein.

Figures 11, 12, 13, 14, 15, 16, 17, 18, 19, 20, 21, 22:
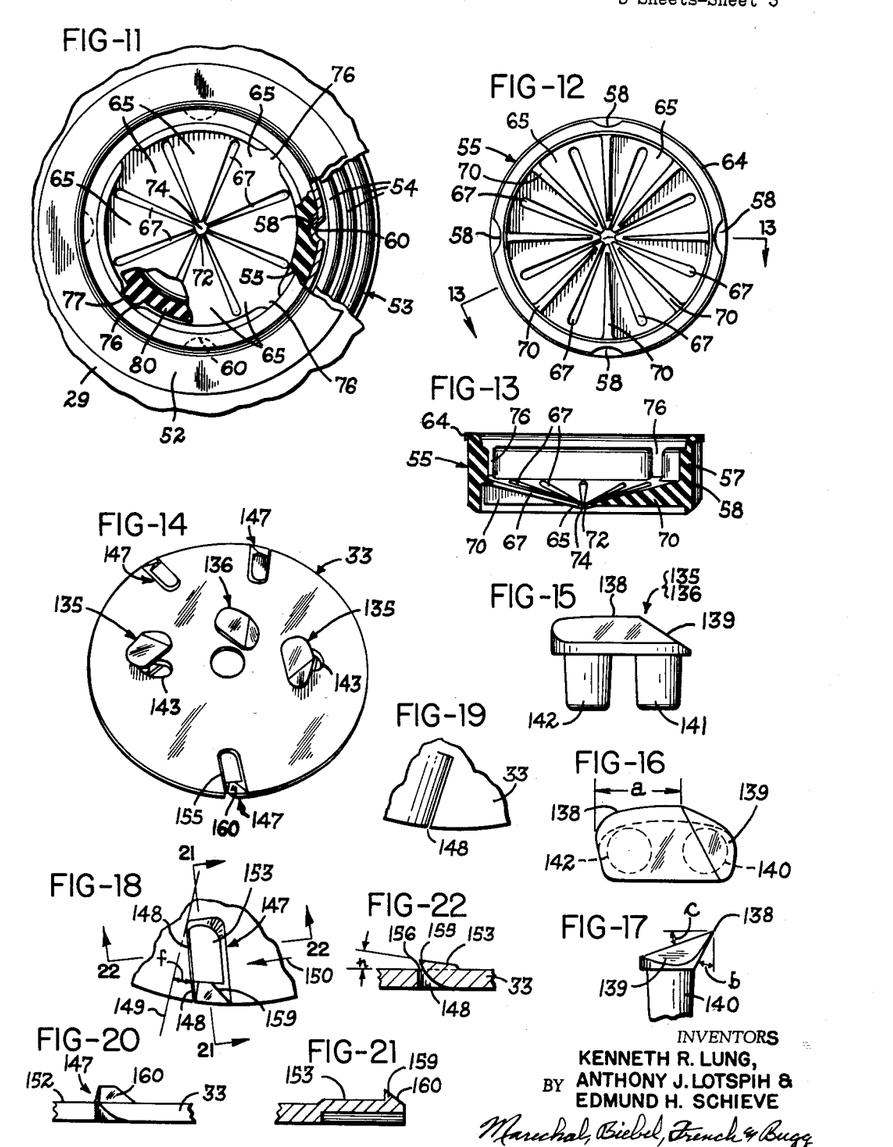
FIG. 11 is a sectional view essentially along the line 11—11 of FIG. 1 with the stopper removed.
FIG. 12 is a bottom view of the splash guard.
FIG. 13 is a sectional view of the splash guard essentially along the line 13—13 of FIG. 12.
FIG. 14 is a perspective view looking generally downward on the rotor illustrating the various cutting means.
FIGS. 15, 16 and 17 are side, top and end views, respectively, of the stationary and pivotal cutters.
FIGS. 18, 19 and 20 are top, bottom and side views, respectively, of the peripheral cutters.
FIGS. 21 and 22 are sectional views essentially along the lines 21—21 and 22—22, respectively, of FIG. 18.

The rotor 33 has a pair of pivotal cutters 135 and a stationary cutter 136, each formed of hardened tool steel or the like, mounted thereon for performing a rough cutting action on the waste material when the unit is in operation. As shown in FIGS. 15–17, each of these cutters has a cutting edge 138, measured by the dimension $a$, in overhanging relation with the top surface of rotor 33, and having a rake angle $b$ and a clearance angle $c$ (FIG. 17). With this construction the cutters are capable of cutting substantially all waste materials including meat bones and metallic bottle caps. The leading angle of each cutter 135–136 has a beveled face 139 thereon which, when the cutter is mounted, extends from near the rotor surface upwardly for deflecting waste material.

Each of the pivotal cutters 135 has a leg 140 on the leading end thereof below the beveled face 139 for mounting in the aperture 141 on the rotor 33 (see FIG. 10), while the other leg 142 fits into an angular slot 143 which permits the cutter to pivot between advanced and retracted positions. Both the legs 140 and 142 extend completely through the rotor 33 and are rigidly secured, for example by welding, to the arm 144 having a weight 145 on one end thereof. However, the arm 144 could be connected solely to either of the legs 140 and 142 without departing from the invention.

When the rotor 33 is moving at high speed, centrifugal force moves each weight 145 radially outward with a consequent movement of the cutters 135 to the advanced position, as shown by cutter 135a in FIG. 7, wherein a maximum of the cutting edge 138 is exposed to the direction of rotation, and there is only slight clearance between the relieved portion 104 on the lower end 103 of the vane 100, as indicated by arrow 146 of FIG. 7, so that waste material which is held by the vane 100 against rotor 33 and which protrudes into the path of the pivotal cutters 135 will normally have a chunk cut therefrom. If the particular piece of waste material is tough and a piece is not immediately cut therefrom, a cut or gash will be made therein and subsequent cuts by these pivotal cutters 135 will reduce the material to smaller particles. In this advanced position of the cutters, each cutting edge 138 preferably forms an acute angle $e$ with the direction of rotation, as indicated by arrow 146, so that the cutting edge 138 slices into the particles of waste material.

A piece of waste material cannot become wedged between one of the pivotal cutters 135 and one of the vanes 100 as the cutter will first be forced to the retracted position, as shown by cutter 135 of FIG. 7, wherein the cutting edge 138 is no longer exposed to the direction of rotation, and the bevel face 139 merely deflects to one side any waste material which the cutter contacts. Immediately after the cutter clears such an object, it is automatically returned to its advanced position by the weights 145. Hence it is substantially impossible to jam the rotor 33 by wedging an object, such as a metallic bottle cap, between the pivotal cutters 140 and one of the vanes 100.

The stationary cutter 136 has the same general configuration as the pivotal cutters 135 but is rigidly mounted on the rotor by legs 140–142 for the primary purpose of preventing waste material from collecting near the center of rotor 33 and spinning therewith. Upon contact with such waste material, the face 139 on the leading edge of the cutter 136 will deflect it upwardly and to one side. After cutter 136 is secured to the rotor 33, any portions of the legs 140 and 142 which extend below the lower surface of the rotor 33 are removed in order to produce a substantially flat surface on this portion of the rotor.

The rotor 33 also includes a plurality of peripheral cutters 147, shown best in FIGS. 18–22, which are spaced around the outlying edges of the rotor 33 for the purpose of further reduction of the rough cuts made by the pivotal and stationary cutters 135 and 136. Each of these cutters 147 is formed by first cutting a slot 148 in the rotor 33 along a line parallel to the desired leading edge of the cutter. In the preferred design, this line is along a chord of the circle defined by the outer periphery of the rotor 33, as opposed to a radius, in such a manner than an angle $f$ will be formed with a radius line 149 so that the outermost part of the cutter trails the innermost part thereof in the direction of rotation as indicated by arrow 150.

The rotor 33 is then placed in a die, and the trailing side of the slot is stamped upwardly so that the lower edge thereof is raised above the top surface 152 of the rotor 33 a predetermined distance. A portion of the deformed section is then ground away to produce a surface 153 which forms an angle $h$, preferably at least three degrees, with the surface 152 of the rotor 33 and extends through the lower edge of the upturned section to form a knife-like cutting edge 155 (FIG. 22) having a clearance with the forward edge 156 of the slot 148 for passage of particles of waste therebetween to the discharge chamber 40. The cutters 147 may have an upstanding section 159 with a flat surface 160 ground thereon at an angle for cooperation with the tapered section 91 of the shredder ring 35, as shown best in FIGS. 8 and 21. The peripheral cutters 147 have been described as formed by a particular method, but while this method is preferred, it is contemplated that other methods of fabrication, could be utilized to produce an equivalent cutter.

During operation of the unit, water is allowed to run continuously into the grinding chamber 50, and this water together with the waste material in the grinding chamber 50 is thrown by centrifugal force against the walls of the frusto-conical section 85 and the shredder ring 35. Such material as is thrown against the frusto-conical section 85 is deflected downwardly onto the rotor 33 at a point closer to the outer periphery thereof, hence facilitating movement of the material to the shredder ring 35, and any waste material which lands near the center of the rotor 33 is thrown upward and to one side by the beveled face 139 of the stationary cutter 136.

Rotation of the waste material in the grinding chamber 50 is substantially reduced by the vanes 100, which stop the rotation of and deflect downwardly the particles thrown against the surface 102 thereof which is perpendicular to the direction of rotation of the rotor 33 and hence to the general direction of movement of the waste material. Some of this material will be held substantially stationary against the rotor 33 by the lower ends 103 of the vanes 100 to be cut by the pivotal cutters 135 in the manner described above and also shredded or otherwise cut as the peripheral cutters 147 pass thereunder.

The cutting of the peripheral cutters 147 is essentially a shredding action, but some slicing will result from the fact that the cutting edge 155 lies along a chord as opposed to a radius of the rotor 33. Some of the small shreds or chips of the waste material produced by the peripheral cutters 147 may pass through the rotor 33 to the discharge chamber 10 via the slots 148 below the cutting edges 155.

When the particles which do not pass through slots 148 are sufficiently reduced in size, they are thrown by centrifugal force into and held stationary by the top portions 94 of the channels 88 where they are further reduced by the shredding and crushing action of the upstanding section 157 of the peripheral cutters 147. After being reduced to a sufficiently small size, they are forced into the lower portions 95 of the channels 88 under the pressure of water and other particles which are being forced into the upper portions 94 of the channels 88.

Comminution of the waste material also occurs whenever the cutting edges of the cutters 135, 136 or 147 contact a piece of waste material. The high rate of speed of these cutters permits them to cut into the waste material even though this material is not being held by a vane 100 or shredder ring 35. Also, if a piece of waste material, such as a metallic bottle cap, should become wedged on one of the cutters 135 or 147, it would be immediately removed as ths particular cutter passes one of the vanes 100.

Due to the high rate of speed at which the various cutters travel, the cuts, slices, shreds, etc. are not clearly defined and have been described as such merely for the purpose of aiding the general understanding of the operation of the invention. The essential point is that the above structure reduces the waste material to particles sufficiently small to be flushed down a drain. Also, it is contemplated that the above described preferred number and location of the pivotal, stationary and peripheral cutters could be modified in certain manners without departing from the scope of the invention. For example, the number of each of the cutters 135, 136 and 147 could be varied and their specific location on the rotor varied so long as the functional characteristics, as described above, are substantially maintained.

When the waste material is reduced to small particles and reaches the discharge chamber 40 below the rotor 33, the weights 145 act as impellers setting up a vortex which causes the water having the comminuted particles entrained therein to be expelled from chamber 40 through the outlet 37 into the drain line 41. This drain line 41 has a flared outer end 163 (FIG. 1) which is received in the rubber gasket 164 and clamped to the outlet 37 by the internally threaded member 165 which engages the threads around the outlet 37. This rubber gasket 164 eliminates any metal to metal contact between the drain pipe 41 and the outlet 37 hence reducing vibrations and the noise level.

A sheet metal casing 168 covers the upper portion of the unit below its mounting on the sink, and a similar casing 169 encloses the lower portion. The upper casing 168 is held in place by lower casting 26, and the lower casing 169 is clamped to the lower casting 26 by a plurality of clips 170 (FIG. 3) which are formed in the sides of the casing 169. To place the lower casing on the unit, it is merely necessary to exert an upward force thereon to cause the tongue 172 of the clips 170 to snap into the grooves 174 thereby securely holding the lower casing 169 in place. To remove this housing 169, it is necessary to insert a screwdriver or similar tool behind each tongue 172 to pry it from groove 174 while exerting a downward pull on the casing 169.

The starting capacitor, fuses, and similar associated electrical apparatus 177 are mounted on a plate 180 (FIG. 1) which is secured in the lower casing 169 by a plurality of equally spaced screws 181, hence permitting the reset button 183 to be positioned in any of a number of positions with respect to the lower casing 169. For example, if there are four equally spaced threaded bores 184 in the lower casing and four openings in the plate, the reset button can be positioned in any of the four positions wherein these bores and openings can be aligned. This feature permits the reset button 183 to be located near front of the unit regardless of the position that the outlet 37 assumes when mounted on a sink.

The upper casting 25 and casing 168 are provided with openings 186–187 for connection of an automatic dishwasher to the unit for handling of the waste water therefrom, and plugs 188–189 close these openings when such a dishwasher is not associated therewith. Appropriate modifications in the electrical controls for the motor 32 can be made to actuate the waste grinder in response to the water discharge cycles of the dishwasher.

The invention has accordingly provided an improved waste grinder for domestic use which is mounted on a sink or the like in such a manner to substantially reduce the vibration and noise level of the unit when in operation. A novel splash guard is provided which will substantially eliminate the possibility of a waste particle being thrown from the unit and which will maintain its shape substantially indefinitely. The rotor and its associated cutters cooperate with the frusto-conical section, the vanes, and the shredder ring to reduce waste material quickly, including hard tough materials, such as bones and bottle caps, to a size which can be handled in the usual drainage system.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A waste grinder adapted for domestic use, comprising an annular cast metallic housing defining a grinding chamber, a shredder ring formed in said housing at the base of said chamber having a first cylindrical section with essentially the same internal diameter as the adjacent portion of said chamber, a tapered section adjacent said first cylindrical section extending downwardly to a diameter greater than the diameter of said first section, a second cylindrical section adjacent the lower side of said tapered section, a plurality of spaced axially extending channels in said shredder ring including a first portion having constant width and gradually increasing depth extending through said first cylindrical and said tapered sections and a second portion having downwardly increasing depth and width extending through said second cylindrical section, and a motor driven rotor mounted for rotation about a vertical axis in said housing and having cutting means thereon for close cooperation with said shredder ring.

2. A waste grinder adapted for domestic use, comprising an annular cast metallic housing defining a grinding chamber, an annular shredder ring formed in said housing at the base of said chamber having a first cylindrical section adjacent the portion of said housing which defines said chamber, a tapered section adjacent said first cylindrical section extending downwardly to a diameter greater than the diameter of said first section, a second cylindrical section adjacent the lower side of said tapered section, said cylindrical and tapered sections having a plurality of spaced axially extending channels therein, vane means integrally formed on said housing and extending downwardly from near the top of said chamber to said tapered section of said shredder ring, said vane means having the trailing side thereof substantially perpendicular to the adjacent wall of said housing for imparting an anti-rotational force to waste material during the grinding operation, a plurality of peripheral cutters on said rotor each including a slot extending inwardly from the periphery thereof to a position below the innermost edge of said vane means, a knife edge parallel to and positioned above the trailing side of said slot, a plurality of pivotal cutters on said rotor each having an overhanging cutting edge thereon, and means responsive to the rotation of said rotor for moving said pivotal cutter about a vertical axis between an advanced position wherein a maximum of said cutting edge is exposed in the direction of rotation of said rotor for close cooperation with said vane means and a retracted position wherein said pivotal cutters are moved toward the center of said rotor to prevent waste material from being wedged between one of said pivotal cutters and said vane means.

3. A rotor adapted for use in a waste grinder, comprising a disk-like element having a member mounted near the center thereof for preventing waste material from collecting near the center of said rotor, at least one pivotal cutter mounted on said rotor and having a cutting edge thereon spaced above the top surface of said rotor, a beveled surface on the leading portion of said pivotal cutters which extends upwardly from near the surface of said rotor for deflecting waste material upwardly during operation of said grinder, a pair of axially extending legs on said cutter for mounting on said rotor, means defining an axially extending aperture in said rotor for receiving one of said legs for relative angular movement therebetween, means defining a slot in said rotor for receiving the other of said legs for pivotal movement of said cutter between an advanced position wherein a maximum of said cutting edge is exposed in the direction of rotation of said rotor and a retracted position wherein said cutter is moved closer to the center of said rotor, and weight means rigidly connected to at least one of said legs for causing movement of said cutter to said advanced position in response to the rotation of said rotor.

4. A waste grinder adapted for domestic use comprising, an annular metallic housing defining a grinding chamber, a shredder ring formed in said housing at the base of said chamber having a first cylindrical section with essentially the same internal diameter as the adjacent portion of said chamber, a tapered section adjacent said first cylindrical section extending downwardly and outwardly to a diameter greater than the diameter of said first section, a second cylindrical section adjacent the lower side of said tapered section, a plurality of spaced axially extending channels in said shredder ring including a first portion extending through said first cylindrical and said tapered sections and a second portion extending downwardly through said second cylindrical section, a motor driven rotor mounted for rotation about a vertical axis in said housing below said tapered section and having an outer diameter greater than said first cylindrical portion for close cooperation with said shredder ring, and cutting means including at least one rigid cutter on said rotor having a generally radially extending cutting edge above and parallel to the plane of the top surface of said rotor for cutting and splicing the waste material which is held against rotation by and projects from said channels into the path of said cutting means.

5. A waste grinder adapted for domestic use, comprising an annular metallic housing defining a grinding chamber, a shredder ring formed in said housing at the base of said chamber having a first cylindrical section with essentially the same internal diameter as the adjacent portion of said chamber, a tapered section adjacent said first cylindrical section extending downwardly to a diameter greater than the diameter of said first section, a second cylindrical section adjacent the lower side of said tapered section, a plurality of spaced axially extending channels in said shredder ring including a first portion extending through said first cylindrical and said tapered sections and a second portion extending downwardly through said second cylindrical section, a motor driven rotor mounted for rotation about a vertical axis in said housing below said tapered section and having outer diameter slightly less than said second cylindrical portion for close cooperation with said shredder ring, cutting means including a rigid cutter on said rotor having a generally radially extending cutting edge above and parallel to the plane of the top surface of said rotor, and at least one vane on the side wall of said grinding chamber extending downwardly to a point just above said cutting edge, said cutting edge having a length such that it extends inwardly at least as far as the innermost portion of the adjacent portion of said vane so that said cutting edge cuts the waste material which is held against rotation by said vane and said channels and projects into the path of said cutting edge.

6. A waste grinder adapted for domestic use comprising, an annular metallic housing defining a frustoconical grinding chamber, a shredder ring formed in said housing at the larger end of said chamber having a first generally cylindrical section with essentially the same internal diameter as the adjacent portion of said chamber, a tapered section adjacent said first cylindrical section extending downwardly to a diameter greater than the diameter of said first section, a second cylindrical section adjacent the lower side of said tapered section, a plurality of spaced axially extending channels in said shredder ring including a first portion extending through said first cylindrical and said tapered sections and a second portion extending downwardly through said second cylindrical section, a motor driven rotor mounted for rotation about a vertical axis in said housing below said tapered section and having outer diameter slightly less than said second cylindrical portion for close cooperation with said shredder ring, cutting means including a rigid cutter on said rotor having a generally radially extending cutting edge above and parallel to the plane of the top surface of said rotor, and at least one vane on the side wall of said grinding chamber having a lowermost portion disposed immediately above said cutting edge, said lowermost portion being aligned with the portion of said shredder ring between two of said channels for unobstructed operation of each of said channels, said cutting edge having a length such that it extends inwardly at least as far as the inner portion of said lowermost portion of said vane so that said cutting edge cuts the waste material which is held against rotation by said vane and said channels and projects into the path of said cutting edge.

7. A waste grinder adapted for domestic use comprising, an annular metallic housing defining a frustoconical grinding chamber, a shredder ring formed in said housing at the larger end of said chamber having a plurality of alternate ribs and channels to shred waste material which is forced thereagainst, a disk shaped rotor mounted for rotation about a vertical axis in said housing for cooperation with said shredder ring, said rotor having a flat top surface and an outer diameter slightly less than said shredder ring for close cooperation with said shredder ring, cutting means including a rigid cutter on said rotor having a generally radially extending cutting edge above and parallel to the plane of said top surface of said rotor, and at least one vane on the side wall of said grinding chamber having a lowermost portion disposed immediately above said cutting edge, said lowermost portion being aligned with the portion of said shredder ring between two of said channels for unobstructed operation of each of said channels, said cutting edge having a length such that it extends inwardly at least as far as the inner portion of said lowermost portion of said vane so that said cutting edge cuts the waste material which is held against rotation by said vane and said channels and projects into the path of said cutting edge.

8. A waste grinder adapted for domestic use comprising, an annular metallic housing defining a frustoconical grinding chamber, a shredder ring formed in said housing at the larger end of said chamber having a plurality of alternate ribs and channels to shred the waste material which is forced thereagainst by centrifugal force, a disk shaped rotor mounted for rotation about a vertical axis in said housing for close cooperation therebetween, at least one rigid cutter on said rotor having a generally radially extending cutting edge above and parallel to the plane of the top surface of said rotor, and at least one vane on the side wall of said grinding chamber having a lowermost portion disposed immediately above said cutting edge, said lowermost portion being aligned with the portion of said shredder ring between two of said channels for unobstructed operation of each of said channels, said cutting edge having a length such that it extends inwardly at least as far as the inner portion of said lowermost portion of said vane so that said cutting edge cuts the waste material which is held against rotation by said vane and said channels and projects into the path of said cutting edge, and pivotal cutters on said top surface of said rotor inwardly of the innermost portion of said vane and having a cutting edge above and generally parallel to said top surface for cutting and slicing the waste material.

9. A waste grinder adapted for domestic use comprising, a housing defining a grinding chamber, a shredder ring including a series of alternate ribs and grooves positioned at the base of said chamber, a rotor mounted for rotation in cooperation with said ring and having thereon at least one elongated pivotal cutter having a leading end and a trailing end, a knife cutting edge on the leading side of said cutter spaced above and generally parallel to the surface of said rotor, said cutter having a leading side surface extending from said cutting edge downwardly at an acute angle with said rotor so that said cutting edge overhangs said leading side surface for maximum cutting, a beveled surface along one side on said leading end of said cutter extending gradually upward from near the surface of said rotor for deflecting upwardly and outwardly waste material which contacts said beveled surface during rotation thereof, a mounting pin on said cutter below each of said ends, said rotor having an axially extending aperture receiving said mounting pin below said leading end for pivotal movement of said cutter on said rotor about said leading end, slot means for receiving the other of said pins to limit the rotation of said cutter to an advanced position wherein the leading portion of said cutting edge is ahead of the trailing portion thereof for effecting a slicing action of said waste material and to a retracted position wherein less of said cutting edge is exposed in said direction of rotation, and means for yieldingly urging said cutter to said advanced position.

10. A waste grinder adapted for domestic use comprising, a housing defining a grinding chamber, a shredder ring including a series of alternate ribs and grooves positioned at the base of said chamber, a rotor mounted for rotation in cooperation with said ring and having thereon at least one elongated pivotal cutter having a leading end and a trailing end, a knife edge on the leading side of said cutter spaced above and generally parallel to the surface of said rotor, said cutter having a leading side surface extending from said cutting edge downwardly at an acute angle with said rotor so that said cutting edge overhangs said leading side surface, mounting means for securing said cutter on said rotor for pivotal movement of said cutter to an advanced position wherein said cutting edge is exposed to the direction of travel of said rotor for effecting a slicing action of said waste material and to a retracted position wherein less of said cutting edge is exposed in said direction of rotation, means for yieldingly urging said cutter to said advanced position, and means for rotating said rotor at high speed to centrifugally force the waste material which has been reduced in size by cutting and slicing action of said cutter against said shredder ring to further comminute the waste.

11. A waste grinder adapted for domestic use comprising, a housing defining a grinding chamber, a shredder ring including a series of alternate ribs and grooves positioned at the base of said chamber, a disk shaped rotor mounted for rotation in cooperation with said ring and having a substantially flat top surface which defines the bottom of said grinding chamber, at least one elongated pivotal cutter having a leading end and a trailing end, a cutting edge on the leading side of said cutter spaced above and generally parallel to said flat top surface of said rotor, said cutter having a leading side surface extending from said cutting edge downwardly at an acute angle with said top surface so that said cutting edge overhangs said leading side surface, mounting means for securing said cutter on said rotor for pivotal movement of said cutter to an advanced position wherein said cutting edge is exposed to the direction of travel of said rotor for effecting a cutting and slicing action of said waste material and to a retracted position wherein less of said cutting edge is exposed in said direction of rotation to prevent jamming of waste material between said cutter and said shredder ring, and means for yieldingly urging said cutter to said advanced position.

12. A waste grinder adapted for domestic use comprising, a housing defining a grinding chamber, a shredder ring including a series of alternate ribs and grooves positioned at the base of said chamber, a rotor mounted for rotation in cooperation with said ring, at least one vane on the side wall of said grinding chamber extending downwardly to a lowermost portion spaced just above the top surface of said rotor, at least one elongated pivotal cutter on said rotor having a leading end and a trailing end, a cutting edge on the leading side of said cutter spaced above and generally parallel to said top surface, said cutter having a leading side surface extending from said cutting edge downwardly at an acute angle with said rotor so that said cutting edge overhangs said leading side surface, mounting means for securing said cutter on said rotor for pivotal movement of said cutter to an advanced position wherein said cutting edge is exposed to the direction of travel of said rotor for effecting a slicing action of said waste material and wherein said trailing end passes in close cooperation with said lowermost portion of said vane means, said cutter being pivotal to a retracted position wherein said cutting edge is spaced from said lowermost portion to eliminate jamming of waste material between said cutter and said vane, and means for yieldingly urging said cutter to said advanced position.

13. Apparatus as defined in claim 12 wherein said means for yieldingly urging said cutter to said advanced position responds to the centrifugal force acting thereon when said rotor is rotated, means defining a discharge chamber below said rotor having a discharge outlet adapted to be connected to a drain, and weight means depending from the under side of said rotor to act as impellers during rotation of said rotor to expel the comminuted waste material from said discharge chamber through said outlet.

14. A waste grinder adapted for domestic use comprising, a housing defining a grinding chamber, a shredder ring including a series of alternate ribs and grooves positioned at the base of said chamber, a rotor mounted for rotation in cooperation with said ring, at least one rigid cutter on said rotor extending inwardly from the peripheral edge thereof and having a first cutting edge above and parallel to the plane of the top surface of said rotor for cutting waste material held by said shredder ring, at least one vane on the side wall of said grinding chamber extending downwardly to a lowermost portion spaced just above said rigid cutters, at least one elongated pivotal cutter on said motor having a leading end and a trailing end, a second cutting edge on the leading side of said pivotal cutter spaced above and generally parallel to the adjacent surface of said rotor, said pivotal cutter having a leading side surface extending from said second cutting edge downwardly at an angle with said rotor so that said cutting edge overhangs said leading side surface, mounting means for securing said pivotal cutter on said rotor for pivotal movement of said pivotal cutter to an advanced position wherein said second cutting edge is exposed to the direction of travel of said rotor for effecting a slicing action of the waste material and wherein said trailing end passes in close cooperation with said lowermost portion of said vane means, said pivotal cutter also being pivotal to a retracted position wherein said second cutting edge is spaced from said lowermost portion to eliminate jamming of waste material between said pivotal cutter and said vane means, and means for yieldingly urging said pivotal cutter to said advanced position.

15. A waste grinder adapted for domestic use comprising, an annular metallic housing defining a frusto-conical grinding chamber, a shredder ring formed in said housing and including a plurality of alternate ribs and channels adapted to shred the waste material which is forced thereagainst, a motor driven rotor mounted for rotation about a vertical axis in said housing for close cooperation with said shredder ring, a plurality of cutters on said rotor having cutting edges above and parallel to the top surface of said rotor, at least one vane on the side wall of said grinding chamber having a lowermost portion disposed immediately above said rotor, said vane extending downwardly in the direction of rotation of said rotor and terminating in said lowermost portion which is perpendicular with respect to said top surface, said lowermost portion being aligned with the portion of said shredder ring between two of said channels for unobstructed operation of each of said channels, said lowermost portion having a side surface which is perpendicular to the motion of the adjacent portion of said rotor for reducing rotation of waste material, said cutting edges being disposed to cut and slice the waste material which is held against rotation by said vane and said channels and projects into the path of said cutting edges.

References Cited by the Examiner

UNITED STATES PATENTS

| | | | |
|---|---|---|---|
| 2,421,014 | 5/47 | Coss et al. | 241—194 X |
| 2,577,152 | 12/51 | Powers | 241—46 X |
| 2,594,250 | 4/52 | Tranbarger | 241—46 |
| 2,822,988 | 2/58 | Hammes | 241—299 X |
| 2,848,172 | 8/58 | Ewing | 241—257 |
| 2,853,248 | 9/58 | Long | 241—257 |
| 2,940,677 | 6/60 | Jordan | 241—257 |
| 2,965,319 | 12/60 | Hyde | 241—100.5 |
| 2,980,348 | 4/61 | Jordan | 241—194 X |
| 2,980,351 | 4/61 | Greene | 241—100.5 |
| 3,112,079 | 11/63 | Niekamp et al. | 241—257 |

J. SPENCER OVERHOLSER, *Primary Examiner.*

ROBERT A. O'LEARY, *Examiner.*

UNITED STATES PATENT OFFICE
CERTIFICATE OF CORRECTION

Patent No. 3,181,802

May 4, 1965

Kenneth R. Lung et al.

It is hereby certified that error appears in the above numbered patent requiring correction and that the said Letters Patent should read as corrected below.

Column 1, line 72, for "calims" read -- claims --; column 5, line 42, for "angle" read -- edge --; column 6, line 33, for "than" read -- that --; column 7, line 31, for "ths" read -- this --; column 12, line 71, for "motor" read -- rotor --.

Signed and sealed this 12th day of October 1965.

(SEAL)
Attest:

ERNEST W. SWIDER
Attesting Officer

EDWARD J. BRENNER
Commissioner of Patents